(12) United States Patent
Gregorio

(10) Patent No.: US 12,347,305 B2
(45) Date of Patent: Jul. 1, 2025

(54) WAYPOINT-BASED PREMISES GUIDANCE

(71) Applicant: The ADT Security Corporation, Boca Raton, FL (US)

(72) Inventor: Daymein Fisher Gregorio, Clarksville, TN (US)

(73) Assignee: The ADT Security Corporation, Boca Raton, FL (US)

( * ) Notice: Subject to any disclaimer, the term of this patent is extended or adjusted under 35 U.S.C. 154(b) by 78 days.

(21) Appl. No.: 18/187,810

(22) Filed: Mar. 22, 2023

(65) Prior Publication Data

US 2024/0321068 A1  Sep. 26, 2024

(51) Int. Cl.
G08B 7/06 (2006.01)
G08B 3/10 (2006.01)
G08B 5/36 (2006.01)

(52) U.S. Cl.
CPC .............. G08B 7/066 (2013.01); *G08B 3/10* (2013.01); *G08B 5/36* (2013.01)

(58) Field of Classification Search
CPC ............ G08B 7/066; G08B 3/10; G08B 5/36
USPC .................................................. 340/539.13
See application file for complete search history.

(56) References Cited

U.S. PATENT DOCUMENTS

| | | | | |
|---|---|---|---|---|
| 5,462,092 A * | 10/1995 | Franz | ................. | B29B 17/0026 239/145 |
| 5,642,092 A | 6/1997 | Dunne et al. | | |
| 7,026,768 B1 * | 4/2006 | Ruiz | ..................... | G08B 7/066 315/200 A |
| 9,131,660 B2 | 9/2015 | Womble | | |
| 9,689,542 B2 * | 6/2017 | Anderson | ............. | G08B 7/066 |
| 10,991,216 B1 * | 4/2021 | Alali | ..................... | G08B 7/066 |
| 2003/0189823 A1 * | 10/2003 | George | .................... | F21S 4/24 362/147 |
| 2006/0261971 A1 * | 11/2006 | Danvir | ................... | G08B 7/066 340/691.1 |
| 2007/0152808 A1 * | 7/2007 | LaCasse | ............. | G08B 29/188 340/577 |
| 2007/0279210 A1 * | 12/2007 | Li | ......................... | G08B 7/062 702/22 |
| 2011/0211563 A1 * | 9/2011 | Herrala | ................. | H04W 4/029 370/338 |

(Continued)

FOREIGN PATENT DOCUMENTS

KR   1020130001471 A   1/2013

*Primary Examiner* — Kerri L McNally
*Assistant Examiner* — Thang D Tran
(74) *Attorney, Agent, or Firm* — Weisberg I.P. Law, P.A.

(57) ABSTRACT

A premises monitoring system is provided. The premises monitoring system includes a control device. The control device receives sensor data from at least one premises device located at the premises determines. The control device, based on the sensor data, a location of an occupant at the premises, an existence of an emergency condition at the premises, and a location of the emergency condition at the premises. The control device determines, based on the location of the emergency condition and the location of the occupant, an egress path, the egress path comprising a plurality of waypoints in a sequence from the location of the occupant to an egress point. The control device, in response to the occupant reaching one of the plurality of waypoints, causes generation of a guidance indication at a subsequent waypoint of the plurality of waypoints in the sequence.

18 Claims, 5 Drawing Sheets

(56) References Cited

U.S. PATENT DOCUMENTS

| | | | |
|---|---|---|---|
| 2013/0147604 A1* | 6/2013 | Jones, Jr. | G08B 25/08 340/6.1 |
| 2013/0169430 A1* | 7/2013 | Shook | G08B 17/10 340/539.1 |
| 2014/0089143 A1* | 3/2014 | Dione | G06K 19/0723 705/26.61 |
| 2014/0320282 A1* | 10/2014 | Zhang | G08B 7/066 340/502 |
| 2015/0287295 A1* | 10/2015 | Trivelpiece | H04L 45/74 |
| 2015/0310712 A1* | 10/2015 | Lyman | G08B 15/002 348/143 |
| 2015/0348220 A1* | 12/2015 | Sharma | G01C 21/3407 705/324 |
| 2016/0049053 A1* | 2/2016 | Simmons | G08B 7/066 340/815.4 |
| 2016/0110984 A1* | 4/2016 | Seol | G08B 21/02 340/539.13 |
| 2016/0123741 A1* | 5/2016 | Mountain | G08B 5/36 701/533 |
| 2016/0205514 A1* | 7/2016 | Ikeda | H04W 4/043 455/456.1 |
| 2016/0247369 A1* | 8/2016 | Simmons | G08B 7/062 |
| 2016/0300467 A1* | 10/2016 | Warren | G08B 21/02 |
| 2017/0103633 A1* | 4/2017 | Khire | G08B 17/125 |
| 2017/0109981 A1* | 4/2017 | Joseph | G08B 7/066 |
| 2018/0091641 A1* | 3/2018 | Trani | G07C 9/28 |
| 2018/0331846 A1* | 11/2018 | Meakin | H04L 12/2825 |
| 2018/0365942 A1* | 12/2018 | Molloy | A61B 5/0205 |
| 2019/0080577 A1* | 3/2019 | Raz | G01H 3/10 |
| 2019/0188977 A1* | 6/2019 | Moses | H04W 4/024 |
| 2019/0272691 A1* | 9/2019 | Nye | G07C 9/38 |
| 2019/0295207 A1* | 9/2019 | Day | G09F 13/005 |
| 2020/0111353 A1* | 4/2020 | Deng | G06F 3/1423 |
| 2020/0264572 A1* | 8/2020 | Sha | G05B 15/02 |
| 2020/0402374 A1* | 12/2020 | Child | H04L 12/2829 |
| 2020/0413237 A1* | 12/2020 | Stowell | G08B 25/10 |
| 2021/0158670 A1* | 5/2021 | Derickson | G08B 7/066 |
| 2021/0325188 A1* | 10/2021 | Nanda | G06F 16/29 |
| 2022/0230528 A1 | 7/2022 | Wedig et al. | |
| 2022/0274019 A1* | 9/2022 | Delmonico | G06F 16/9537 |
| 2023/0017059 A1* | 1/2023 | Donegan | G08B 29/186 |
| 2023/0315375 A1* | 10/2023 | Sundholm | G08B 7/062 345/1.1 |
| 2024/0214768 A1* | 6/2024 | Else | G06K 7/1417 |

* cited by examiner

WAYPOINT-BASED PREMISES GUIDANCE

TECHNICAL FIELD

The present technology is generally related to waypoint-based guidance through a premises.

BACKGROUND

Premises monitoring systems, such as home security and automation systems often incorporate a range of "smart" devices and functionalities that allow interaction with a user. For example, the systems may integrate various types of sensors to gather data about aspects of the premises. The systems may also be capable of communicating with users by means of audio devices, lighting devices, and displays. Some systems are capable of controlling premises access by, for example, locking and unlocking doors.

BRIEF DESCRIPTION OF THE DRAWINGS

A more complete understanding of the present disclosure, and the attendant advantages and features thereof, will be more readily understood by reference to the following detailed description when considered in conjunction with the accompanying drawings wherein.

DETAILED DESCRIPTION

Embodiments of the present disclosure may leverage the use of premises devices, prerecorded messages and two-way communication devices to guide occupants, such as pets and/or people, from areas of danger at a premises to a place of safety. At least some embodiments described herein achieve this result without relying on live communication from a person.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. The terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. Multiple components may interoperate and modifications and variations are possible to achieve electrical and data communication.

In some embodiments described herein, the term "coupled," "connected," and the like, may be used herein to indicate a connection, although not necessarily directly, and may include wired and/or wireless connections.

Figure 1:
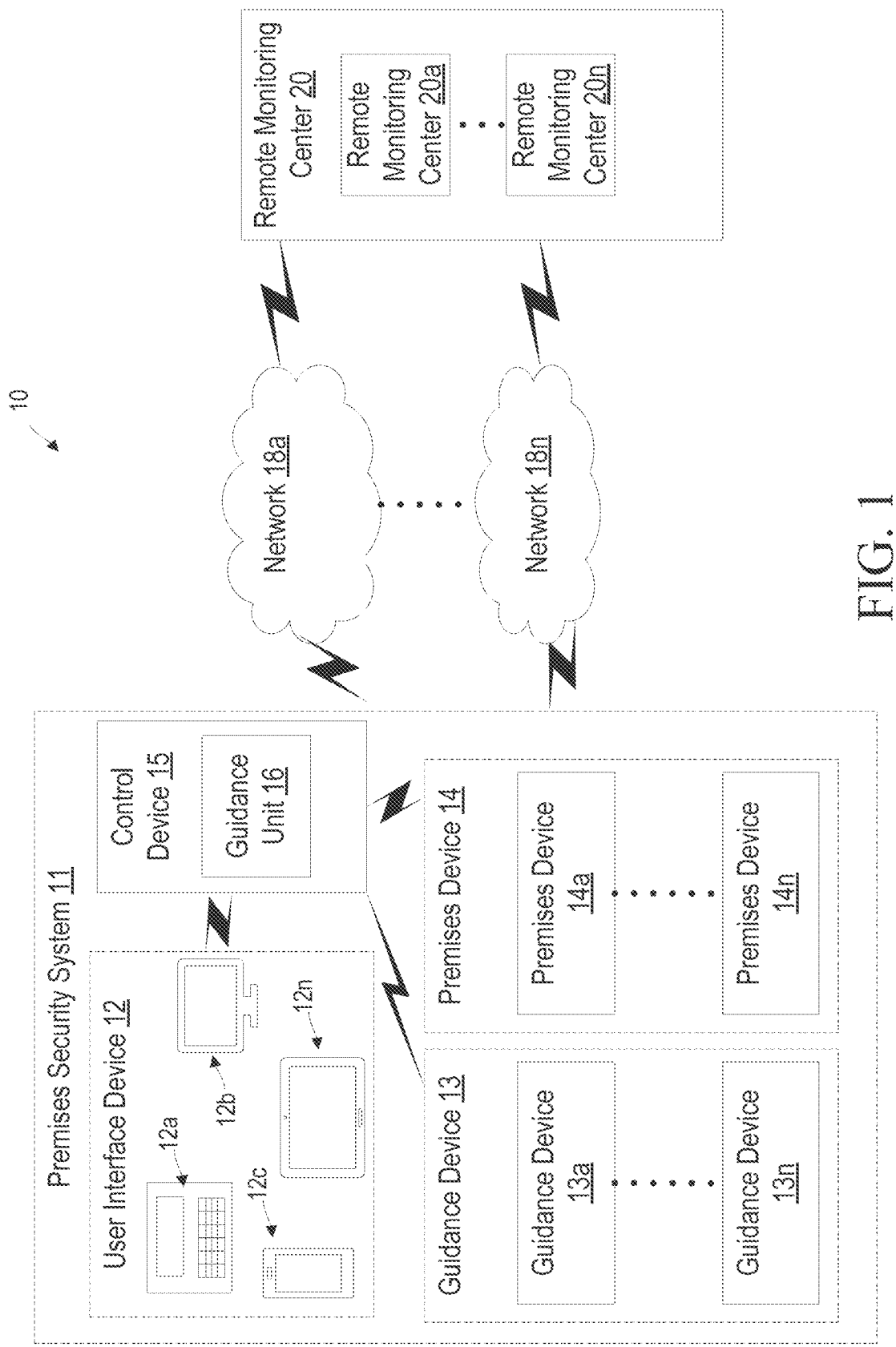
FIG. 1 is a diagram of an example system comprising a premises monitoring system according to embodiments of the present disclosure.

Referring now to the drawing figures in which like reference designators refer to like elements there is shown in FIG. 1 a system designated generally as "10." System 10 may include premises monitoring system 11, in which premises monitoring system 11 includes and/or is associated with one or more user interface devices 12a to 12n (collectively referred to as "user interface device 12"), one or more guidance devices 13a to 13n (collectively referred to as "guidance device 13"), one or more premises devices 14a to 14n (collectively referred to as "premises device 14"), and control device 15. Control device 15 may include, e.g., a control panel. According to various embodiments, the premises monitoring system 11 may be, for example, a premises security system and/or a premises automation system.

Premises device 14 may include sensors, control panels, control apparatuses, images capture devices, life safety devices, premises automation devices, guidance devices, and/or other devices. For example, the types of sensors may include various life safety related sensors, such as motion sensors, fire sensors, carbon monoxide sensors, flooding sensors and contact sensors, among other sensor types. A control apparatus may include, for example, a device configured to adjust at least one premises setting, such as lighting, temperature, energy usage, door lock and power settings, among other settings associated with the premises or devices on the premises. Image capture devices may include digital cameras and/or video cameras, among other image capture devices. Guidance device 13 may include indicators, audio devices (e.g., speakers), light devices (e.g., smart lights, LED lighting), audiovisual displays, actuators (e.g., motorized blinds or curtains), among other guidance indicating devices that can be activated by control device 15.

Premises device 14 may be configured for sensing one or more aspects of the environment, such as an open or closed door, open or closed window, motion, heat, smoke, gas, sounds, images, people, animals, objects, etc. Premises device 14 may also determine a sensor indication based on the sensed environment and transmit the message to another device in the premises monitoring system 11. As further described herein, premises device 14 may also be configured to indicate to an occupant a path, thereby acting as a waypoint as described herein.

System 10 may further include one or more networks 18a to 18n (collectively referred to as "network 18"), and one or more remote monitoring centers 20a to 20n (collectively referred to as "remote monitoring center 20"), communicating with each other or with at least one other entity in system 10.

User interface device 12 may be a wireless device that allows a user to communicate with control device 15. User interface device 12 may be a portable control keypad/interface 12a, computer 12b, mobile phone 12c or tablet 12n, among other devices that allow a user to interface with control device 15 and/or one or more premises devices 14. User interface device 12 may communicate at least with control device 15 using one or more wired and/or wireless communication protocols. For example, portable control keypad 12a may communicate with control device 15 via a ZigBee based communication link, e.g., network based on Institute of Electrical and Electronics Engineers (IEEE) 802.15.4 protocols, and/or Z-wave based communication link, or over the premises' local area network, e.g., network-based on Institute of Electrical and Electronics Engineers (IEEE) 802.11 protocols, user interface device 12.

The premises devices 14 may communicate with control device 15 via proprietary wireless communication protocols and may also use Wi-Fi. Other communication technologies can also be used, and the use of Wi-Fi is merely an example.

Control device 15 may provide one or more of management functions, monitoring functions, analysis functions, guidance functions, control functions such as power management, premises device management and alarm management and/or analysis, among other functions to premises monitoring system 11. In particular, control device 15 may manage one or more life safety or premises automation features. Life safety features may correspond to monitoring system functions and settings associated with premises conditions that may result in life threatening harm to a person, such as carbon monoxide detection and intrusion detection. Premises automation features may correspond to monitoring system functions and settings associated with video capturing devices and non-life-threatening conditions of the premises, such as lighting and thermostat functions. Control device 15 may also include a guidance unit 16 for guiding an occupant, as described herein.

Control device 15 may communicate with network 18 via one or more communication links. In particular, the communications links may be broadband communication links, such as a wired cable modem or Ethernet communication link, and a digital cellular communication link, such as a long term evolution (LTE) and/or 5G based link, among other broadband communication links. A broadband link in various embodiments may be a communication link other than a plain old telephone service (POTS) line. An Ethernet communication link may be an IEEE 802.3 or 802.11 based communication link. Network 18 may be a wide area network, local area network, wireless local network and metropolitan area network, among other networks. Network 18 provides communications among one or more of control device 15, remote monitoring center 20 and premises device 14.

Figure 2:
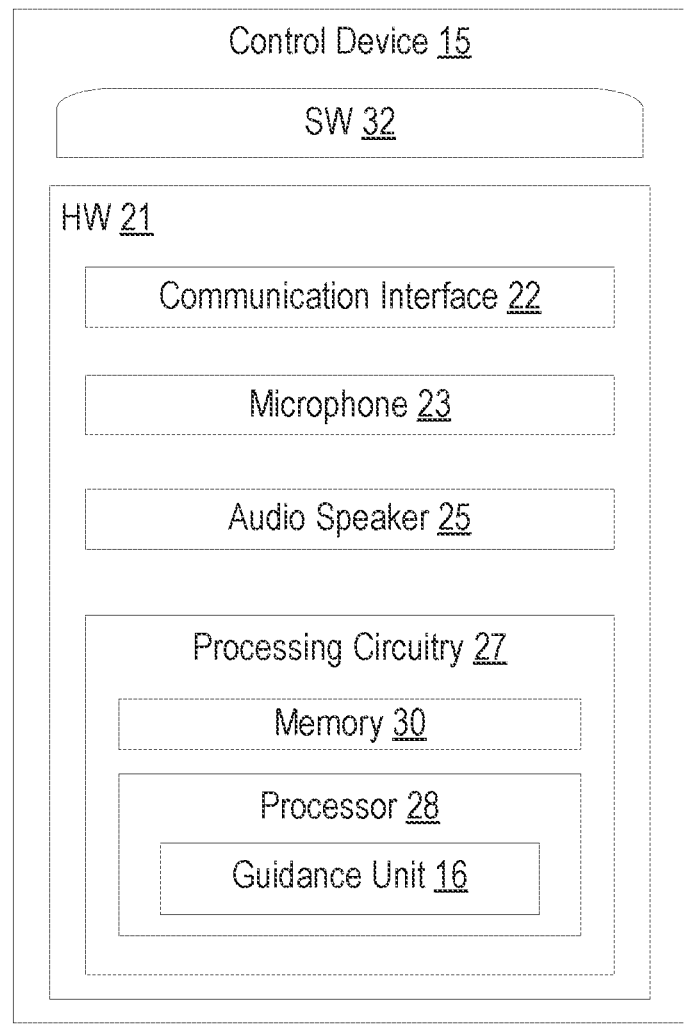
FIG. 2 is a block diagram of a control device according to some embodiments of the present disclosure.

Referring now to FIG. 2, the example system 10 includes a control device 15 that includes hardware 21 enabling the control device 15 to communicate with one or more entities in system 10 and to perform one or more functions described herein.

The hardware 21 may include a communication interface 22 for setting up and maintaining at least a wired and/or wireless connection to one or more entities in system 10, such as remote monitoring center 20, premises devices 14, user interface device 12, another control device 15, etc.

The hardware 21 may include microphone 23, which may include, for example, a voice input component, e.g., a component, such as a microphone and/or audio signal processing circuitry, to receive spoken verbal commands from a user.

Control device 15 may include audio speaker 25, which may include, for example, one or more speakers, audio drivers, audio processing circuitry, etc., for generating audio and/or verbal instructions and/or messages. For example, audio speaker 25 may produce and/or generate and/or synthesize speech from text (i.e., text-to-speech). In one or more embodiments, control device 15 may act as a waypoint, as described herein.

In the embodiment shown, the hardware 21 of the control device 15 further includes processing circuitry 27. The processing circuitry 27 may include a processor 28 and a memory 30. In particular, in addition to or instead of a processor, such as a central processing unit, and memory, the processing circuitry 27 may comprise integrated circuitry for processing and/or control, e.g., one or more processors, processor cores, field programmable gate arrays (FPGAs), and/or application specific integrated circuits (ASICs) adapted to execute instructions. The processor 28 may be configured to access (e.g., write to and/or read from) the memory 30, which may comprise any kind of volatile and/or nonvolatile memory, e.g., cache, buffer memory, random access memory (RAM), read-only memory (ROM), optical memory, and/or erasable programmable read-only memory (EPROM).

Thus, the control device 15 further has software 32 stored internally in, for example, memory 30, or stored in external memory (e.g., database, storage array, network storage device, etc.) accessible by the control device 15 via an external connection. The software 32 may be executable by the processing circuitry 27. The processing circuitry 27 may be configured to control any of the methods and/or processes described herein and/or to cause such methods, and/or processes to be performed, e.g., by control device 15. Processor 28 corresponds to one or more processors 28 for performing control device 15 functions described herein. The memory 30 is configured to store data, programmatic software code and/or other information described herein. In some embodiments, the software 32 may include instructions that, when executed by the processor 28 and/or processing circuitry 27, cause the processor 28 and/or processing circuitry 27 to perform the processes described herein with respect to control device 15. For example, processing circuitry 27 of the control device 15 may include guidance unit 16, which is configured to perform one or functions described herein such as with respect to guidance of an occupant.

Although FIGS. 1 and 2 show guidance unit 16 as being within a respective processor, this unit may be implemented such that a portion of the guidance unit 16 is stored in a corresponding memory within the processing circuitry 27. In other words, guidance unit 16 may be implemented in hardware or in a combination of hardware and software within the processing circuitry 27.

Figure 3:
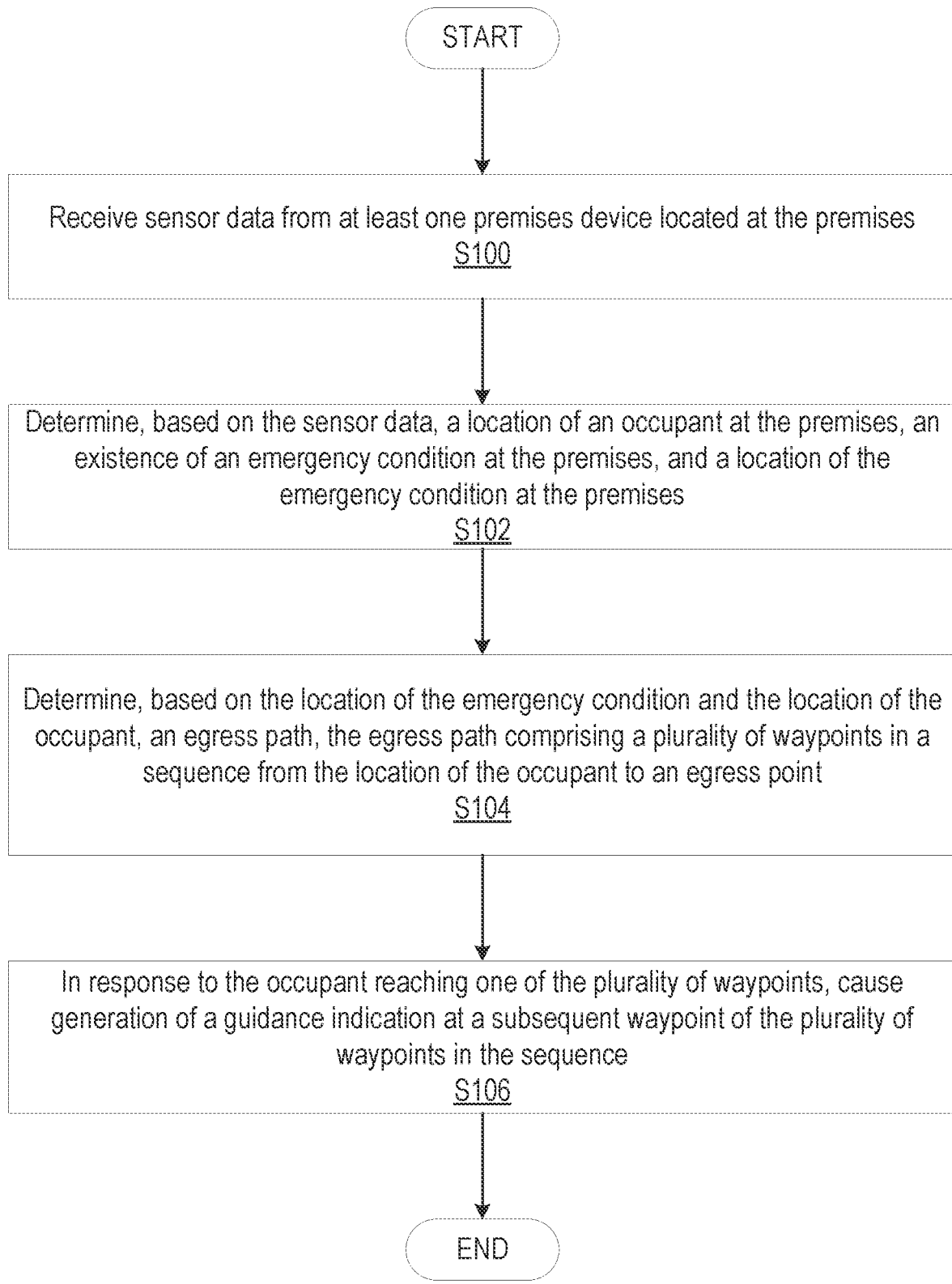
FIG. 3 is a flowchart of an example process implemented by a control device according to some embodiments of the present disclosure.

FIG. 3 is a flowchart of an example process implemented by a control device 15 according to one or more embodiments of the present disclosure. One or more blocks described herein may be performed by one or more elements of control device 15 such as by one or more of communication interface 22, microphone 23, image sensor 24, audio speaker 25, processing circuitry 27 (including the guidance unit 16), processor 28 that is caused to perform at least one action, step and/or process based on a plurality of instructions stored in memory 30, etc. Control device 15 is configured to receive sensor data from at least one premises device located at the premises (Block S100). Control device 15 is configured to determine, based on the sensor data, a location of an occupant at the premises, an existence of an emergency condition at the premises, and a location of the emergency condition at the premises (Block S102). Control device 15 is configured to determine, based on the location of the emergency condition and the location of the occupant, an egress path, the egress path comprising a plurality of waypoints in a sequence from the location of the occupant to an egress point (Block S104). Control device 15 is configured to, in response to the occupant reaching one of the plurality of waypoints, cause generation of a guidance indication at a subsequent waypoint of the plurality of waypoints in the sequence (Block S106).

According to one or more embodiments, the at least one premises device 14 is at least one of: an audio sensor, a motion sensor, a smoke detector, a thermal sensor, a dog bark sensor, a glass break sensor, a radio frequency identification (RFID) reader, or an entry sensor.

According to one or more embodiments, the location 46 of the occupant 50 is determined based on sensor data received from at least one of the audio sensor, the motion sensor, or the RFID reader.

According to one or more embodiments, the plurality of instructions is further configured to cause the at least one processor 28 to operate at least one door control corresponding to a door on the egress path 40 between the location 46 of the occupant 50 and the egress point 48.

According to one or more embodiments, the guidance indication is generated by at least one of an audio device, a light, or a curtain actuator.

According to one or more embodiments, the occupant 50 is a first occupant, and the plurality of instructions is further configured to cause the at least one processor 28 to: determine, based on the sensor data, a location 54 of a second occupant 52 of the premises. According to one or more embodiments, the egress path 40 includes a rendezvous path 56 from the location 46 of the first occupant 50 to the location 54 of the second occupant 52.

According to one or more embodiments, the plurality of instructions is further configured to cause the at least one processor 28 to determine the occupant 50 is unable to follow the egress path 40. According to one or more embodiments, the plurality of instructions is further configured to cause the at least one processor 28, in response to determining that the occupant 50 is unable to follow the egress path 40, to determine a modified egress path with at least one additional waypoint that is different from the plurality of waypoints.

According to one or more embodiments, the plurality of instructions is further configured to cause the at least one processor 28 to determine that the occupant 50 is unable to follow the egress path 40 based on at least one of: expiration of a predetermined timeout period, a command from the occupant, or a query to the occupant.

According to one or more embodiments, the plurality of instructions is further configured to cause the at least one processor 28 to determine an ingress path from an ingress point to the location of the occupant.

Having described the general process flow of arrangements of the disclosure and having provided examples of hardware and software arrangements for implementing the processes and functions of the disclosure, the sections below provide details and examples of arrangements for guidance of an occupant through a premises. One or more control device 15 functions described below may be performed by one or more of processing circuitry 27, processor 28, guidance unit 16, etc.

Figure 4:
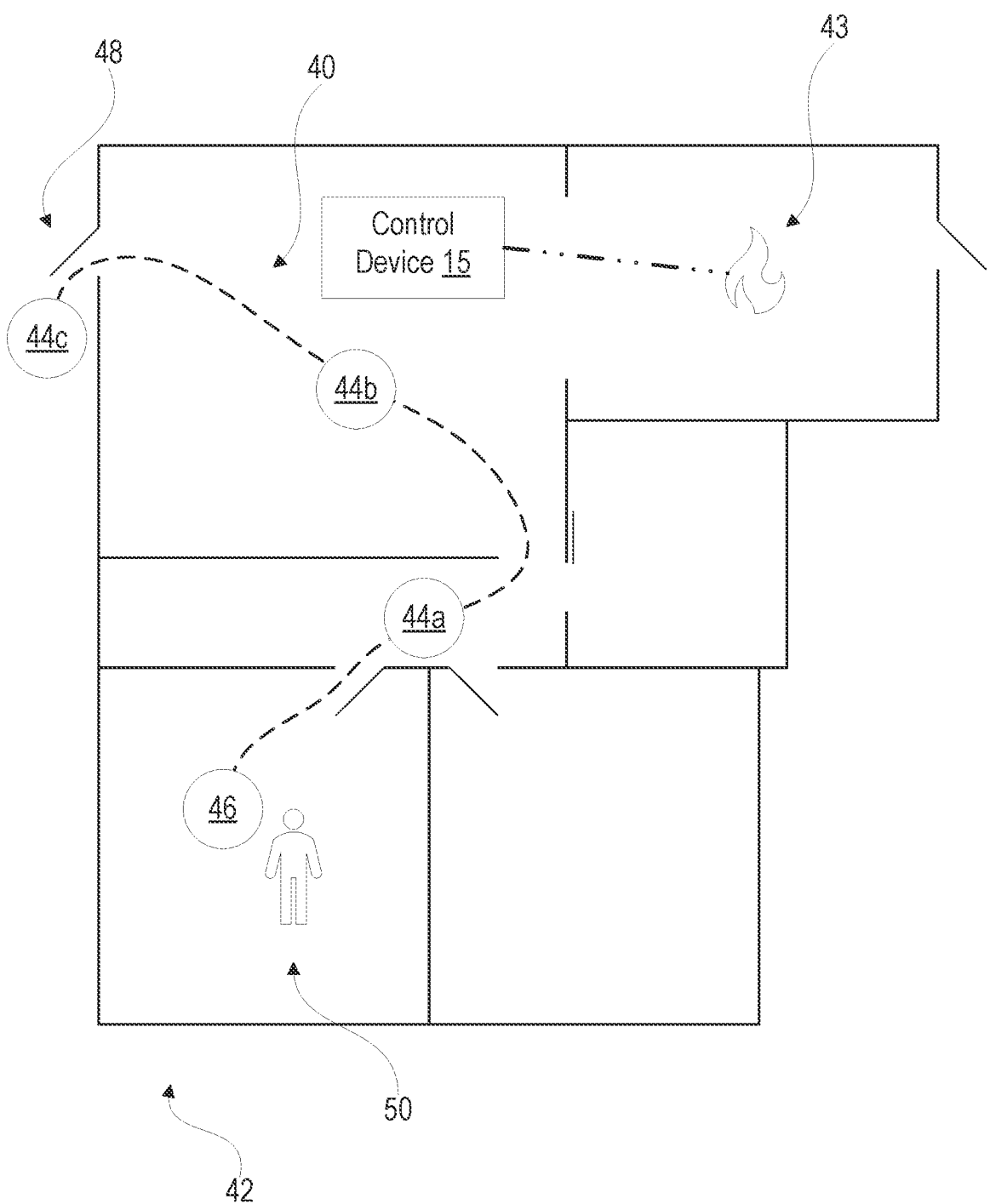
FIG. 4 is a diagram of an example guidance path according to some embodiments of the present disclosure.

FIG. 4 depicts an example according to one or more embodiments of the present disclosure. As described herein, the control device 15 located at the premises 42 detects the presence of an emergency condition 43, which may be, e.g., by way of one or more premises devices 14 (e.g., sensors) as described herein. In the shown embodiment, the emergency condition 43 is a fire. However, the emergency condition 43 may be a different emergency condition, such as carbon monoxide detection or another emergency condition. The control device 15 determines the location 46 of the occupant 50, e.g., by way of one or more premises devices 14. In the embodiment of FIG. 4, the occupant is a person; however, the occupant may be, as a non-limiting example, an animal such as a pet. The control device 15 determines an egress path 40 arranged between the location 46 of an occupant 50 and an egress point 48. The egress path 40 includes a plurality of waypoints 44a-44c (collectively "waypoint 44"). The control device 15 activates a guidance indicator (e.g., by way of one or more guidance devices such as a premises device 14) at waypoint 44a to guide the occupant 50 from the determined location 46 to waypoint 44a while the remaining waypoints 44b-44c are not activated for guidance. The control device 15, such as via one or more premises devices 14, determines when the occupant 50 reaches the waypoint 44a. Upon the occupant 50 reaching waypoint 44a, the control device 15 activates a guidance indicator at waypoint 44b. Control device 15 may turn off the guidance indicator at waypoint 44a upon activation of the guidance indicator at waypoint 44b. Upon the occupant 50 reaching waypoint 44b, the control device 15 activates a guidance indicator at waypoint 44c. Control device 15 may turn off the guidance indicator at waypoint 44b upon activation of the guidance indicator at waypoint 44c. In one or more embodiments, control device 15 may act as a waypoint providing a guidance indicator along the egress path.

Figure 5:
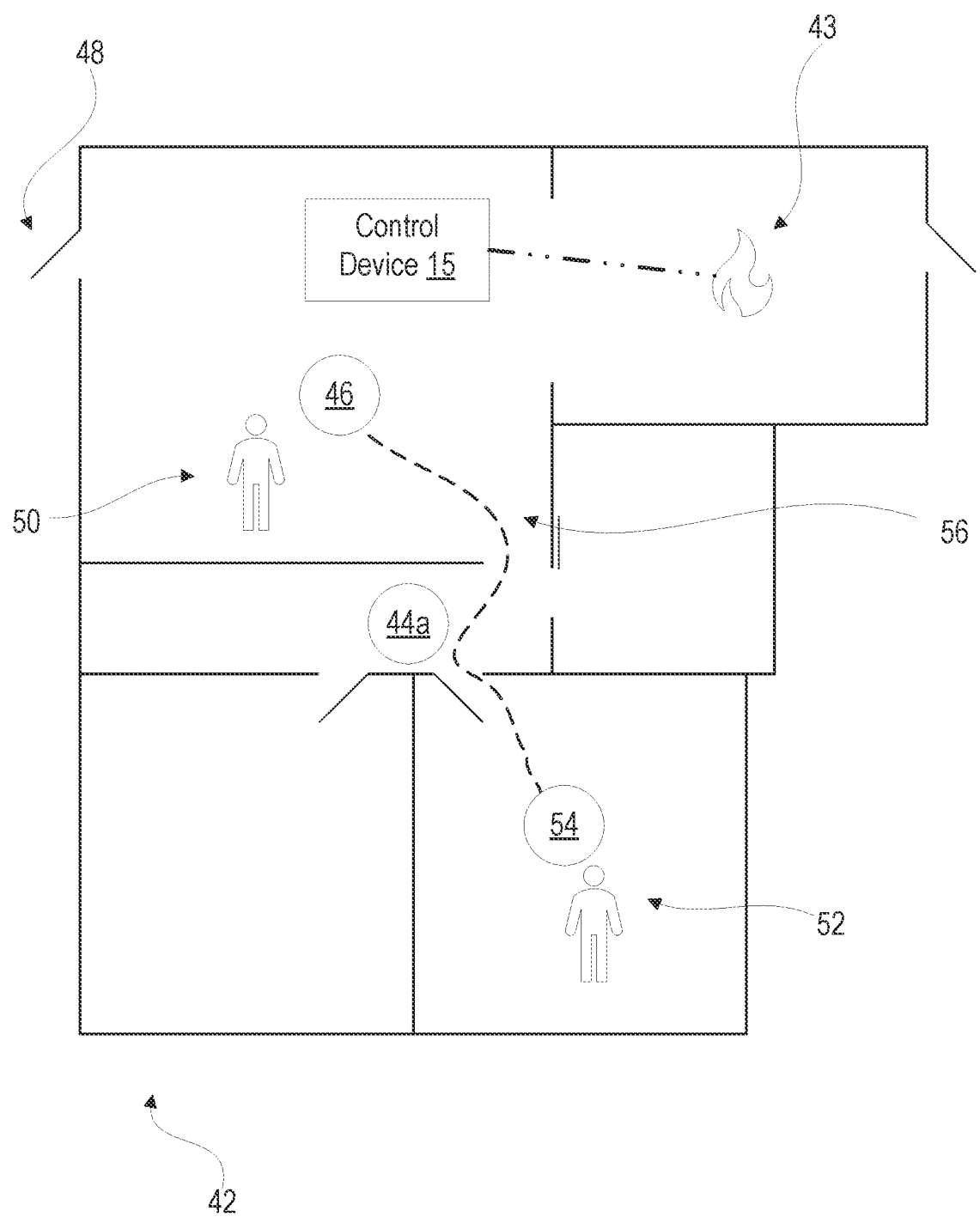
FIG. 5 is a diagram of an example guidance path according to some embodiments of the present disclosure.

FIG. 5 depicts an example embodiment where control device 15 determines a first occupant 50 is at a first location 46 and a second occupant 52 is at a second location 54 within the premises 42. Further, similar to FIG. 4, control device 15 located at the premises 42 detects the presence of an emergency condition 43, which may be, e.g., by way of one or more premises devices 14 (e.g., sensors) as described herein. The control device 15 may guide the second occupant 52 to the location 46 of the first occupant 50 along a rendezvous path between the first location 45 of the second occupant 52 and the second location 54 of the second occupant 52. The control device 15 activates a guidance indicator at waypoint 44a to guide the second occupant 52 to the waypoint 44a. When the second occupant reaches the waypoint 44a, the control device 15 activates a guidance indicator at the location 46 of the first occupant 50 to guide the second occupant 52 from the waypoint 44a to the location 46 of the first occupant 50. Control device 15 may turn off the guidance indicator at waypoint 44a upon activation of the guidance indicator at location 46. Thus, by selectively activating one or more guidance indicators, the control device 15 may guide one or more occupants out of the premises in the event of an emergency.

In at least one embodiment, the user may setup a prerecorded messages to play as part of the guidance indicator in the event of an emergency, such as a fire or intruder.

In at least one embodiment, the homeowner may map the premises based on locations of premises devices 14, and determination of the egress path, rendezvous path, etc. is based on the mapping.

At least one embodiment incorporates the following process. First, a premises device 14, e.g., camera or sensor, detects an emergency condition 43. Next, the premises monitoring system 11, e.g., via the control device 15, locates the occupant 50 based on current sensor data and history. Then, the premises monitoring system 11, e.g., via the control device 15, calculates the optimal safety area, e.g., egress point 48, and the path, e.g., egress path 40, to it using at least the location of the emergency condition 43 and the occupant's location 46. Next, the premises monitoring system 11, e.g., via the control device 15, determines which premises devices 14 (e.g., a subset of the premises devices 14) may be used to guide the occupant 50 along the egress path 40 to safety at the egress point 48. Next, a premises device 14, which may be proximate or nearest to the occupant generates a guidance indication to alert and guide the occupant 50 to the premises device 14, i.e., to the first waypoint in a sequence of waypoints. Then, the premises monitoring system 11, e.g., via the control device 15, determines a next premises device 14 that should issue the guidance indication based on the occupant 50 reaching the first waypoint. The next premises device 14 generates the next guidance indication to guide the occupant 50 to the next waypoint in the sequence of waypoints. If the occupant's 50 location cannot be determined, the premises monitoring system 11 may generate the guidance indication on the next predetermined premises device 14 along the egress path after expiration of a predetermined amount of time. Finally, a determination of the next premises device 14 that should issue the guidance is performed and generation of the guidance indication repeats along the egress path 40 to move the occupant 50 to an area of safety.

In one or more embodiments, as the occupant 50 moves to a new area associated with the next waypoint 44 in the sequence, the occupant's location is shared with emergency services.

Various scenarios depicted herein describe premises 42 in the form of a residence. However, according to various embodiments, premises 42 can be any building or structure capable of being occupied, whether or not enclosed, and may include one or more structures.

An example scenario, in which an embodiment described herein may be used, involves a user leaving their pet at home while the user goes to work. While at work, a fire breaks out in the garage of the premises. A premises device 14, such as a smoke detector, is triggered and notifies the control device 15. The control device 15 determines the pet's (i.e., occupant's 50) location, which in this example is the main bedroom that shares a wall with the garage. The control device 15 determines an egress path, which includes waypoints in a sequence, from the main bedroom to an egress point, which in this example is a door in the kitchen that leads to the yard. A premises device 14 in the main bedroom then plays a prerecorded audio message, such as "Come here, Spot. Come here." The dog lifts its head, recognizing the user's voice. Then the message, plays from another premises device 14, which in this example is a hallway camera's speaker, to guide the dog to the first waypoint in a sequence of waypoints. The dog follows the voice to the hallway. Once in the hallway (i.e., the next waypoint), the voice is played from a premises device 14 in the kitchen (i.e., the next waypoint). The dog continues to follow the voice to the kitchen. A premises device 14, e.g., a motion sensor, in the kitchen detects the dog's movement, indicating the dog has reached the kitchen. A premises device 14, such as a speaker-enabled pet door, plays a message in the user's voice and unlocks and/or opens the pet door. The dog, thinking the user is outside, follows the voice out the pet door (i.e., the egress point) and into the yard. The pet door locks behind the dog, keeping the dog in the safe area. The premises monitoring system 11 alerts emergency services and provides to the pet's location, and emergency services can recover the pet from the backyard upon their arrival.

Another example scenario, in which an embodiment described herein may be used, involves a smoke alarm of the premises devices 14 being triggered in the home (i.e., premises 42) while an occupant 50 is there alone. The premises device 14 (e.g., smoke detector) has detected smoke and communicates the smoke alarm to the control device 15. The premises device 14 is in the kitchen. The premises monitoring system 11, e.g., via the control device 15 uses a combination of premises device 14 history and current input to determine the current location of any occupants of the premises 42. The premises monitoring system 11, e.g., via the control device 15, determines the occupant to be in the living room. The living room has premises devices 14 including a two-way talk camera and a smoke alarm. First, the control device 15 causes a message (pre-recorded if available or system generated) to be played stating that there is an emergency condition 43, e.g., a fire, in the kitchen. The control device 15 also causes the camera to detect movement. In this scenario, the occupant 50 is asleep on the sofa and does not react. The control device 15 determines an egress path, which includes waypoints in a sequence, from the living room to an egress point, e.g., the front door. The control device 15 then triggers the smoke alarm in the living room. Once the occupant wakens and moves, the control device 15 causes the message to resume playing, alerting the awakened occupant 50 of the kitchen fire and the best route for escape. For example, the message may be: "Leave the house through the hall and out of the front door." If, for example, due to panic, the occupant 50 passes the front door and enters the neighboring dining room, the video smart hub in the dining room detects that the occupant has deviated from the determined egress path 40, e.g., using a movement sensor in the dining room. The control device 15 may dynamically determine a modified egress path. In at least one embodiment, the control device 15 may generate a modified egress path that activates or reactivates a waypoint on the original egress path 40 out of sequence, or may skip a waypoint in the sequence, to guide the occupant back to the original egress path 40. In at least one embodiment, the generation of the modified egress path may include the addition of waypoints into the sequence of waypoints. The modified egress path may be used to guide the occupant 50 to the original egress point 48 or to a different egress point 48. In this scenario, the control device may cause a premises device 14 to play a message instructing the occupant 50 to exit the room and to leave the premises 42 using the egress point 48, e.g., front door.

Another example scenario, in which an embodiment described herein may be used, involves a first occupant, e.g., a caregiver, at the premises with a second occupant, e.g., young child. A premises device 14, e.g., heat sensor in the laundry is triggered and determined by the control device 15 to be an emergency condition 43. The premises monitoring system 11, e.g., via the control device 15, uses a combination of premises device 14 history and current input to determine the current location of any occupants at the premises 42. The control device 15 determines there is a person in the child's room (i.e., second occupant 52) and another in the living room (the caregiver, i.e., first occupant 50). The locations are on either side of the laundry room. The control device 15 then causes the two-way talk camera in the child's room and the smart hub in the living room to alert both people to the emergency condition 43 and to each other's respective locations and egress routes (e.g., escape routes). In this scenario, for the caregiver, the front door is the determined egress point. In this scenario, for the child, the window is the determined egress point. The caregiver ignores the egress point and rushes toward the child's room but finds a fire (i.e., emergency condition 43) blocking the way. The caregiver takes the risk and dives through the fire to enter the room with the child, but the caregiver is injured in the process. The caregiver, injured, is unable to open or break the window. Rescue personnel, alerted to the current location of the occupants by the control device 15 and/or remote monitoring center 20, arrive and are able to assist. The control device 15 may provide the rescue personnel with a determined rescue path from an ingress point (e.g., front door) to the rescue point (e.g., the child's room) and may trigger guidance indications along the rescue path in a similar manner as described above with respect to the egress path examples.

Another example scenario, in which an embodiment described herein may be used, involves a forced entry into a premises 42 where a hearing-impaired occupant 50 is located. A premises device 14, e.g., glass-break sensor, is triggered in the dining room of the premises 42 by the forced entry. The premises monitoring system 11, e.g., via the control device 15, then uses a combination of premises device 14 history and current input to determine the current location of any occupants. The system determines the occupant 50 to be in the bedroom. Based on premises devices 14 including motion sensors and cameras in and around the dining room and throughout the premises 42, the control device 15 determines an egress path 40 for the occupant 50. The control device 15 may also be in communication with premises devices 14 that include visual and vibration notification systems that may facilitate alerting and guiding the occupant 50. The control device 15 causes the visual and vibration notification systems to wake the occupant 50. The control device 15 also triggers a message to be generated, such as: "Glass break in Dining Room. Exit through garage." The message may, for example, include a flashing display on a premises device 14 on a bedside table. In this scenario, instead of leaving the room, the occupant 50 decides to stay in place. The control device 15 shares both the location of the occupant 50 as well as the potential location of an intruder, who entered the premises 42, with the remote monitoring center 20 and emergency services. This allows emergency response personnel, e.g., law enforcement officers, to apprehend the intruder without mistaking them as the homeowner.

The concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In addition, unless mention was made above to the contrary, the accompanying drawings are not to scale. A variety of modifications and variations are possible in light of the above teachings without departing from the scope and spirit of the present disclosure.

What is claimed is:

1. A premises monitoring system for monitoring a premises, comprising:
a plurality of premises devices comprising at least one of an audio sensor, a motion sensor, a smoke detector, a thermal sensor, a dog bark sensor, a glass break sensor, a radio frequency identification (RFID) reader, or an entry sensor;
a control device in communication with the plurality of premises devices, the control device comprising:
at least one processor; and
at least one memory storing a plurality of instructions that, when executed by the at least one processor, causes the control device to:
receive sensor data from at least one of the plurality of premises devices located at the premises;
determine, based on the sensor data, a location of an occupant at the premises, an existence of an emergency condition at the premises, and a location of the emergency condition at the premises;
determine, based on the location of the emergency condition and the location of the occupant, an egress path, the egress path comprising a plurality of waypoints in a sequence from the location of the occupant to an egress point;
in response to the occupant reaching one of the plurality of waypoints, cause generation of a guidance indication at a next waypoint in the sequence, the guidance indication being generated by at least one of an audio device, a lighting device, or a curtain actuator;
operate at least one door control corresponding to a door on the egress path between the location of the occupant and the egress point;
determine that the occupant is unable to follow the egress path based on at least one of: expiration of a predetermined timeout period, a command from the occupant, or a query to the occupant;
in response to determining that the occupant is unable to follow the egress path, determine a modified egress path that includes one or more of: activating at least one of the plurality of waypoints of the egress path in a different sequence, skipping one of the plurality of waypoints of the egress path, or adding an additional waypoint to the plurality of waypoints of the egress path.

2. The premises monitoring system of claim 1, wherein the plurality of instructions is further configured to cause the at least one processor to:
determine an ingress path from an ingress point to the location of the occupant, the occupant being a first occupant;
determine a location of a second occupant of the premises; and
the egress path comprising a rendezvous path from the location of the occupant to the location of the second occupant.

3. A premises monitoring system comprising:
a control device comprising:
at least one processor; and
at least one memory storing a plurality of instructions that, when executed by the at least one processor, causes the control device to:
receive sensor data from at least one premises device located at the premises;
determine, based on the sensor data, a location of an occupant at the premises, an existence of an emergency condition at the premises, and a location of the emergency condition at the premises;
determine, based on the location of the emergency condition and the location of the occupant, an egress path, the egress path comprising a plurality of waypoints in a sequence from the location of the occupant to an egress point;
in response to the occupant reaching one of the plurality of waypoints, cause generation of a guidance indication at a subsequent waypoint of the plurality of waypoints in the sequence;
determine that the occupant is unable to follow the egress path; and
in response to determining that the occupant is unable to follow the egress path, determine a modified egress path that includes one or more of: activating at least one of the plurality of waypoints of the egress path in a different sequence, skipping one of the plurality of waypoints of the egress path, or adding an additional waypoint to the plurality of waypoints of the egress path.

4. The premises monitoring system of claim 3, wherein the at least one premises device is at least one of: an audio sensor, a motion sensor, a smoke detector, a thermal sensor, a dog bark sensor, a glass break sensor, a radio frequency identification (RFID) reader, or an entry sensor.

5. The premises monitoring system of claim 4, wherein the location of the occupant is determined based on sensor data received from at least one of the audio sensor, the motion sensor, or the RFID reader.

6. The premises monitoring system of claim 3, wherein the plurality of instructions is further configured to cause the at least one processor to operate at least one door control corresponding to a door on the egress path between the location of the occupant and the egress point.

7. The premises monitoring system of claim 3, wherein the guidance indication is generated by at least one of an audio device, a light, or a curtain actuator.

8. The premises monitoring system of claim 3, wherein the occupant is a first occupant, and the plurality of instructions is further configured to cause the at least one processor to:
determine, based on the sensor data, a location of a second occupant of the premises; and
the egress path comprising a rendezvous path from the location of the first occupant to the location of the second occupant.

9. The premises monitoring system of claim 3, wherein the plurality of instructions is further configured to cause the at least one processor to determine that the occupant is unable to follow the egress path based on at least one of: expiration of a predetermined timeout period, a command from the occupant, or a query to the occupant.

10. The premises monitoring system of claim 3, wherein the plurality of instructions is further configured to cause the at least one processor to determine an ingress path from an ingress point to the location of the occupant.

11. A method implemented by a control device of a premises monitoring system, the method comprising:
receiving sensor data from at least one premises device located at the premises;
determining, based on the sensor data, a location of an occupant at the premises, an existence of an emergency condition at the premises, and a location of the emergency condition at the premises;
determining, based on the location of the emergency condition and the location of the occupant, an egress path, the egress path comprising a plurality of waypoints in a sequence from the location of the occupant to an egress point; and in response to the occupant reaching one of the plurality of waypoints, causing generation of a guidance indication at a subsequent waypoint of the plurality of waypoints in the sequence determining that the occupant is unable to follow the egress path; and in response to determining that the occupant is unable to follow the egress path, determining a modified egress path that includes one or more of: activating at least one of the plurality of waypoints of the egress path in a different sequence, skipping one of the plurality of waypoints of the egress path, or adding an additional waypoint to the plurality of waypoints of the egress path.

12. The method of claim 11, wherein the at least one premises device is at least one of: an audio sensor, a motion sensor, a smoke detector, a thermal sensor, a dog bark sensor, a glass break sensor, a radio frequency identification (RFID) reader, or an entry sensor.

13. The method of claim 12, wherein the location of the occupant is determined based on sensor data received from at least one of the audio sensor, the motion sensor, or the RFID reader.

14. The method of claim 11, further comprising operating at least one door control corresponding to a door on the egress path between the location of the occupant and the egress point.

15. The method of claim 11, wherein the guidance indication is generated by at least one of an audio device, a light, or a curtain actuator.

16. The method of claim 11, wherein the occupant is a first occupant, and the method further comprises:

determining, based on the sensor data, a location of a second occupant of the premises; and the egress path comprising a rendezvous path from the location of the first occupant to the location of the second occupant.

17. The method of claim 11, further comprising determining that the occupant is unable to follow the egress path based on at least one of: expiration of a predetermined timeout period, a command from the occupant, or a query to the occupant.

18. The method of claim 11, further comprising determining an ingress path from an ingress point to the location of the occupant.

* * * * *